United States Patent [19]

Richards et al.

[11] Patent Number: 5,253,065
[45] Date of Patent: Oct. 12, 1993

[54] DIGITAL VIDEO EFFECTS SYSTEM FOR REPRODUCING MOVING EFFECTS

[75] Inventors: John W. Richards, Stockbridge; Howard J. Teece, Basingstoke, both of England

[73] Assignee: Sony United Kingdom Limited, Middlesex, United Kingdom

[21] Appl. No.: 842,424

[22] Filed: Feb. 27, 1992

[30] Foreign Application Priority Data

Apr. 30, 1991 [GB] United Kingdom ............ 9109392

[51] Int. Cl.$^5$ .......................................... H04N 5/272
[52] U.S. Cl. ................................. 358/182; 358/183
[58] Field of Search ............ 358/182, 105, 22, 183, 358/181

[56] References Cited

U.S. PATENT DOCUMENTS

| 4,233,631 | 11/1980 | Mahler | 358/182 |
| 4,698,682 | 10/1987 | Astle | 358/182 |
| 4,935,816 | 6/1990 | Faber | |
| 4,951,144 | 8/1990 | Des Jardins | 358/22 X |
| 4,974,083 | 11/1990 | Bloomfield et al. | |
| 5,010,407 | 4/1991 | Trytko | 358/22 X |
| 5,077,610 | 12/1991 | Searby et al. | 358/182 X |
| 5,125,041 | 6/1992 | Kimura et al. | 358/22 X |

FOREIGN PATENT DOCUMENTS 2157126 10/1985 United Kingdom .
2223910 4/1990 United Kingdom .
2236638 4/1991 United Kingdom .

Primary Examiner—Victor R. Kostak
Attorney, Agent, or Firm—William S. Frommer; Alvin Sinderbrand

[57] ABSTRACT

A digital video effects system for emulating motion blurring includes a digital video effects apparatus for manipulating an input image to generate an effect, and a controller for controlling the apparatus to generate an output image sequence comprising a sequence of output images at respective output image timings in which different manipulations are applied for successive images such that the effect changes with time. The controller causes the apparatus to combine a set of constituent images for each output image, the constituent images manifesting manipulations commensurate with respective constituent image timings. The constituent images for each set of constituent images are combined to form a respective output image in the output image sequence.

18 Claims, 10 Drawing Sheets

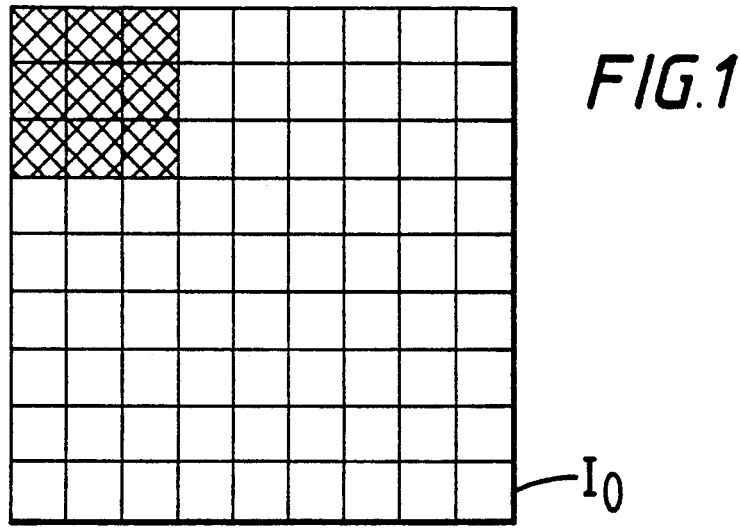
FIG.1
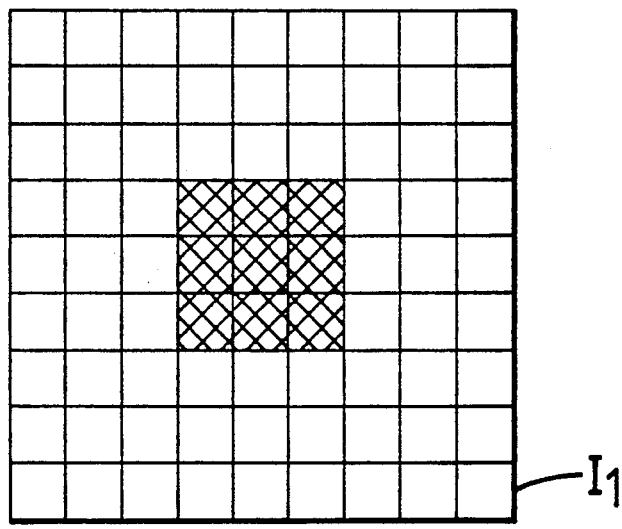
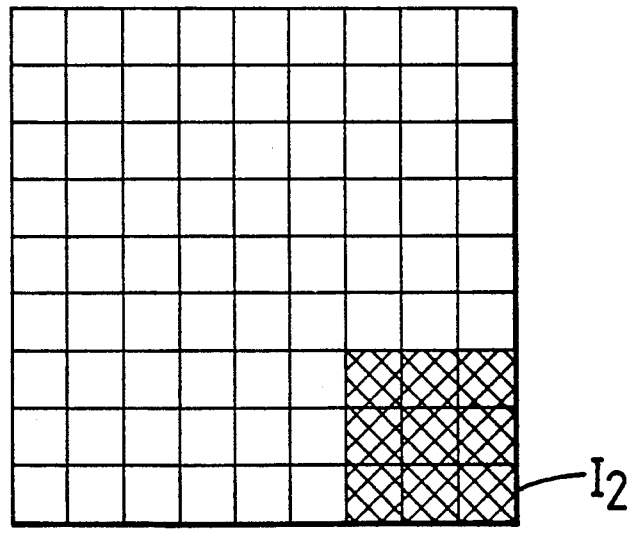

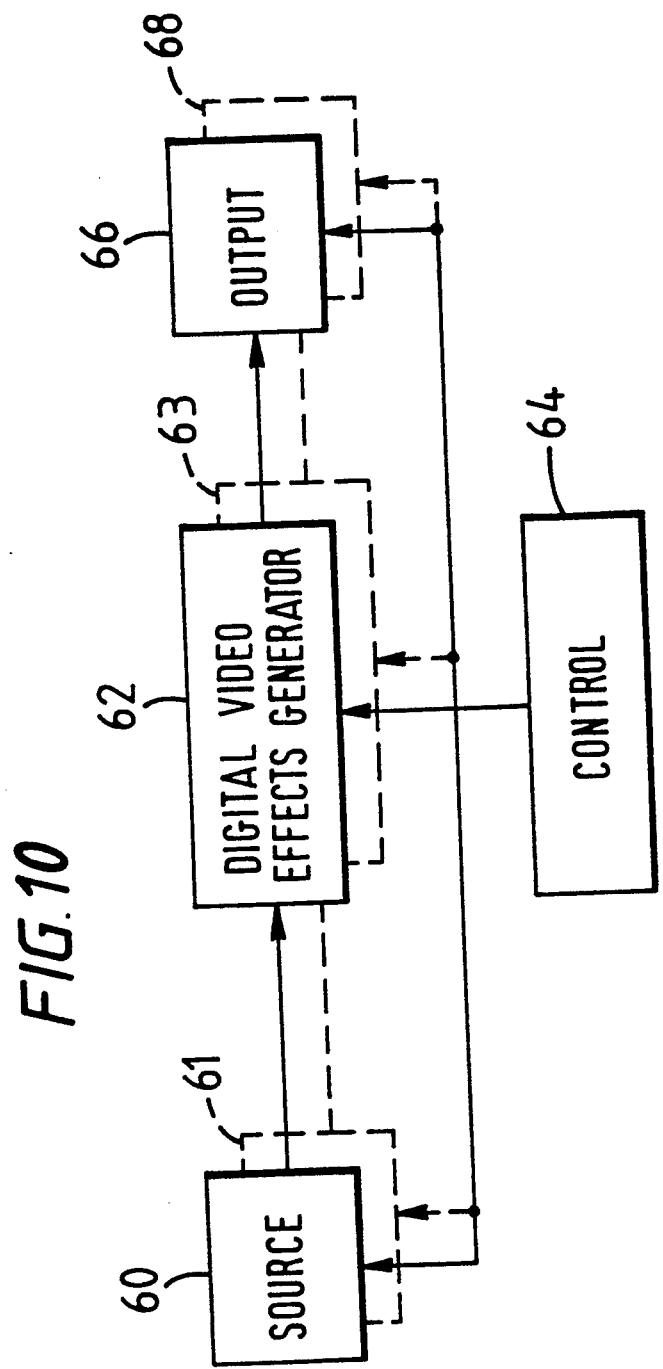

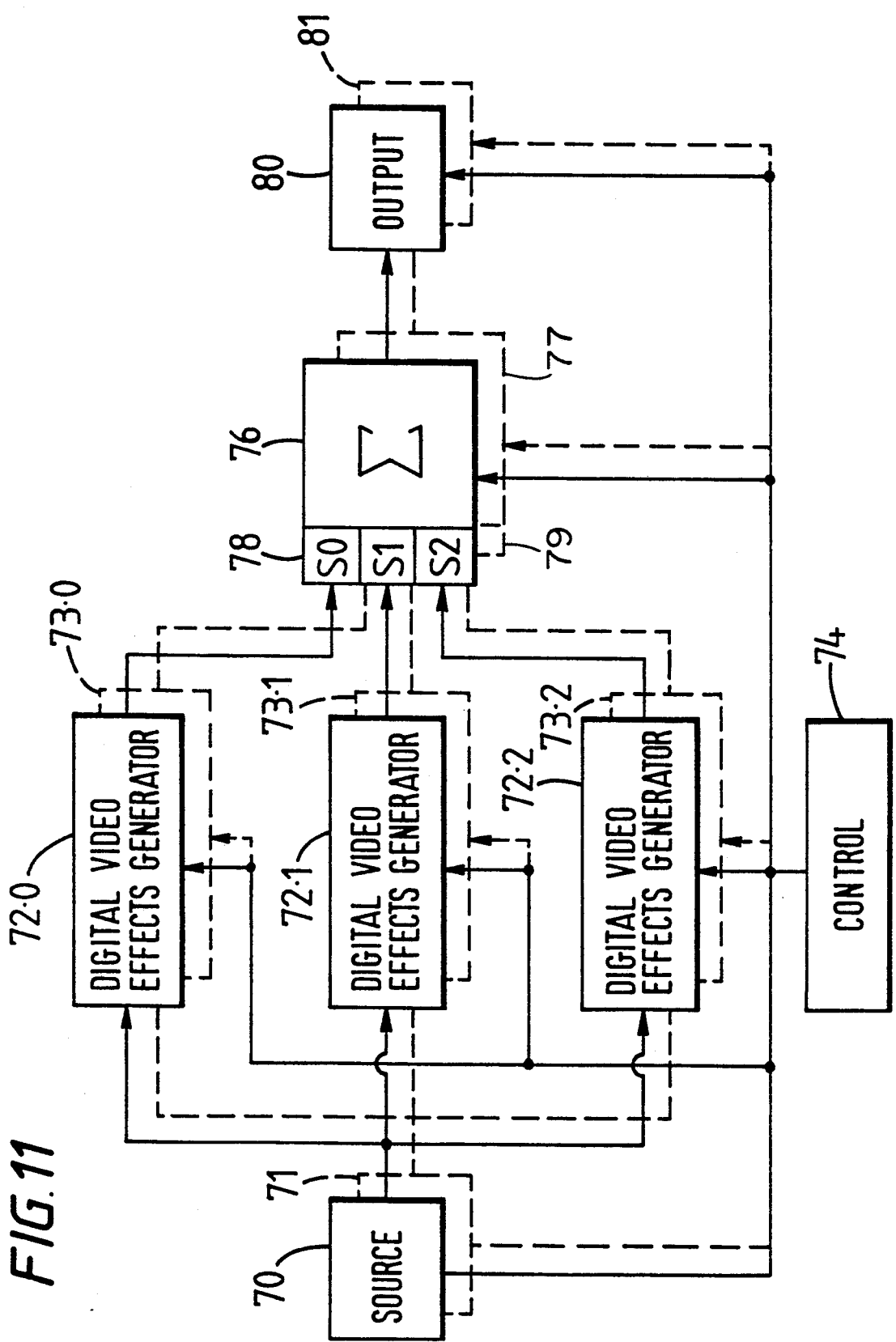

DIGITAL VIDEO EFFECTS SYSTEM FOR REPRODUCING MOVING EFFECTS

BACKGROUND OF THE INVENTION

1. Field of the Invention

The invention relates to a digital video effects system for producing moving effects.

More particularly, the invention relates to a digital video effects system comprising a digital video effects apparatus for manipulating an input image to generate an effect and control means for controlling the apparatus to generate an output image sequence comprising a sequence of output images at respective output image timings in which different manipulations are applied for successive images such that the effect changes with time.

2. Description of the Prior Art

The result of applying different manipulations for successive images produces motion within the output image sequence. Examples of such motion could be the translation or the rotation of the input image in the output image sequence. This, however, is only one type of motion which can be associated with an image sequence output by a digital video effects system. Where the input to the digital video effects system is a sequence of input images there can be movement within that input image sequence itself. Typically this will be natural motion captured via a camera as a result of movement of the camera or movement of the subject being captured.

A visual recording of motion comprises a sequence of samples of the original scene. The precise nature of the sampling will depend on the type of camera used. In the case of a traditional film camera the recording is made by alternating between exposing a frame of the film with an open camera aperture and moving the film forward with the camera aperture closed. In such a case, each exposure comprises an integration of the motion over the period during which the aperture is open. The effect of this integration is to give a blurring of the image. The degree of blurring depends on the speed of movement of the object concerned, and the shutter aperture time, which is itself a function of the camera mechanism, the sensitivity of the film recording medium and the required artistic effect. As the aperture time is decreased, so the moving image will become less blurred and the motion portrayal will become more strobe-like.

The situation is different with a video camera, however, as video is based on a scanning technique, normally an interlaced scanning technique. For interlaced scanning, each video frame, which comprises a certain number of scan lines, is comprised of two field scans, in the first of which alternate lines are scanned and in the second of which the remaining lines are scanned. The image integration time depends on the camera technology used. In the case of a tube camera with a photo-voltaic cell and a scanning electron beam which scans over the cell tracing out the scan lines for the first field followed by the second field, the integration time for each field is approximately one frame time with the integration periods for each field being overlapped by half a frame time (i.e. one field time). These differences have an effect which can be perceived when viewing a recorded moving picture. For example, if the wagon wheels on a stage coach appear to be rotating in the opposite direction to the direction of travel or at a different speed to that expected, one can surmise that this picture has been recorded on film because of the stroboscopic nature of that recording technique.

Video cameras based on Charge Coupled Device (CCD) technology allow more flexibility. The integration period for a CCD operating in a simple field mode corresponds to that for a camera tube (i.e. the integration period for each field is one frame) with the periods for alternate fields being overlapped by 50%. However, it is possible to select the integration period by electronically shuttering the CCD. In this way it is possible in some cases to make wagon wheels appear to rotate backwards to emulate a film recording or to generate special effects.

For the type of motion which is produced in a digital video effects system by changing the manipulation applied for successive output images to form an output image sequence, there is, in effect, no integration period. In other words each new image is generated instantaneously. If, therefore, the input image is translated or rotated within the output image this will have the appearance of a rather unnatural, highly temporarily aliased motion. If it is desired to produce natural looking image sequences, this temporal aliasing is often undesirable. This effect can be particularly disturbing where the source image material is a video image manifesting the integration effects described above.

SUMMARY OF THE INVENTION

An object of the invention is, therefore, to provide a digital video effects system which mitigates the problems of conventional digital video effects systems.

In accordance with a first aspect of the invention, there is provided a digital video effects system comprising:

(i) a digital video effects apparatus for manipulating an input image to generate an effect; and (ii) control means for controlling the apparatus to generate an output image sequence comprising a sequence of output images at respective output image timings in which different manipulations are applied for successive output images such that the effect changes with time, wherein the control means controls the apparatus to generate a set of constituent images for each output image, the constituent images within a set of constituent images manifesting manipulations commensurate with respective constituent image timings and wherein the digital video effects apparatus comprises combining means for combining the constituent images of each set of constituent images to form a respective output image of the output image sequence. The present invention provides for motion blurring to be emulated for digital video effects in a controllable manner.

The control means preferably causes the digital video effects apparatus to combine the constituent images of a set of constituent images with a set of intensity weighting factors such that the sum of the set of intensity weighting factors is substantially unity. This enables the intensities of the output images to be held within appropriate ranges.

In most cases it will be desirable that each intensity weighting factor in the set of intensity weighting factors will be the reciprocal of the number of constituent images forming the corresponding set of constituent images. However, different weighting intensity factors could be chosen if it is desired to achieve special effects.

Preferably, an input key is also manipulated in a manner commensurate with the input image manipulation to generate an output key sequence comprising a sequence of output keys at respective output image timings, a set of constituent keys being generated for respective constituent image timings, for each output key, and the constituent keys of each set of constituent keys being combined to form a respective output key in the output key sequence. This enables the output image sequence to be combined correctly with background information.

Preferably the constituent keys are also combined in accordance with the same set of intensity weighting factors as for the video images. Thus, the amount of background information to be combined for any pixel of the output image can be determined automatically from the keys.

Accordingly, keying means is preferably provided for combining the output image sequence with background information, the keying means comprising multiplier means connected to receive the background information, the multiplier means applying a multiplication factor to background information for combining that information with each output image, which multiplication factor is determined by subtracting the corresponding output key from unity, and adding means connected to receive the output images of the output image sequence and the output of the multiplier means.

In one example of a digital video effects system in accordance with the invention, the digital video effects apparatus comprises first and second video storage devices for the storage of sequences of intermediate images, a switch for selecting an output from one of the first and second video storage devices, a digital video effects unit, and combining means for combining the output of the switch and the output of the digital video effects unit, the output of the combining means being connected to an input of the first and second video storage devices. In this example, the control means controls the system to operate in a plurality of passes, such that: in a first pass, a first sequence of constituent images commensurate with a first sequence of image timings is generated by the digital video effects unit and is stored in one of the video storage devices as an intermediate image sequence; and, in one or more subsequent passes, a further sequence of constituent images commensurate with a further sequence of image timings is generated by the digital video effects unit, the switch selects the output of the one of the video storage devices in which the most recently generated intermediate image sequence is stored whereby the combining means combines the most recently generated intermediate image sequence with the output of the digital video effects unit, and the output of the combining means is stored on the other of the video storage devices as a newly generated intermediate image sequence. Each pass can be performed in real time, so that the blurring effect can be seen building up. However, a number of passes will be needed to generate the output image sequence. An input video storage device can be provided for an input image sequence. However, a separate video storage device for the output image sequence is not necessary as the output image sequence will be stored on one of the first and second video storage devices as the last of the intermediate image sequences.

In an alternative example of a digital video effects system in accordance with the invention, the digital video effects apparatus comprises a plurality of digital video effects units, the number of digital video effects units corresponding to the number of constituent images in the set of constituent images for forming an output image. In this example, the control means causes each digital video effects unit to generate a respective sequence of constituent images such that a corresponding constituent image from each sequence of constituent images forms the set of constituent images for an output image, and the combining means combines corresponding constituent images from respective digital video effects units to form the output images of the output image sequence. This example of the invention enables the final output image sequence to be generated in real time through the use of a plurality of digital video effects units. An input video storage device and an output video storage device can be provided for the input and output image sequences respectively.

In both examples, a parallel arrangement is preferably provided for processing keys for combining the output image sequence with background information.

In accordance with a second aspect of the invention, there is provided a method of emulating motion blurring in a digital video effects system comprising a digital video effects apparatus for manipulating an input image to generate an effect and control means for controlling the apparatus to generate an output image sequence comprising a sequence of output images at respective output image timings in which different manipulations are applied for successive output images such that the effect changes with time, the method comprising:
 (i) generating a set of constituent images for each output image, the constituent images within a set of constituent images manifesting manipulations commensurate with respective constituent image timings; and
 (ii) combining the constituent images of each set of constituent images to form a respective output image in the output image sequence.

The above, and other objects, features and advantages of this invention will be apparent from the following detailed description of illustrative embodiments which is to be read in connection with the accompanying drawings.

BRIEF DESCRIPTION OF THE DRAWINGS

FIG. 1 represents three successive images from a sequence of images;

FIG. 10 is a schematic block diagram of an alternative system for implementing the invention; and FIG. 11 is a schematic block diagram of a further example of a system for implementing the invention.

DESCRIPTION OF THE PREFERRED EMBODIMENTS

FIG. 1 represents part of three successive images $I_0$, $I_1$ and $I_2$ from a sequence of images which could be generated by a conventional digital video effects generator. Specifically, FIG. 1 represents a $9 \times 9$ pixel area within an image at three successive timings for generating a motion sequence. In image $I_0$ corresponding to a timing $T_0$, a $3 \times 3$ block of pixels is located at the top left hand corner of the $9 \times 9$ area. In image $I_1$, corresponding to a timing $T_1$, the $3 \times 3$ block of pixels is located at the centre of the $9 \times 9$ area. In image $I_2$, corresponding to a timing $T_2$, the $3 \times 3$ block is located at the bottom right of the $9 \times 9$ area. The result of moving the block in this way can lead to the motion of the block within the output image sequence having a highly temporarily aliased appearance. The aim of the invention is to mitigate the temporal aliasing of this movement. Typically, in a digital video effects generator, the sequence of images $I_0$, $I_1$ and $I_2$ is the result of mapping a source image onto a linear or non-linear object surface, where the mapping and/or the object surface changes between successive images.

Figure 2:
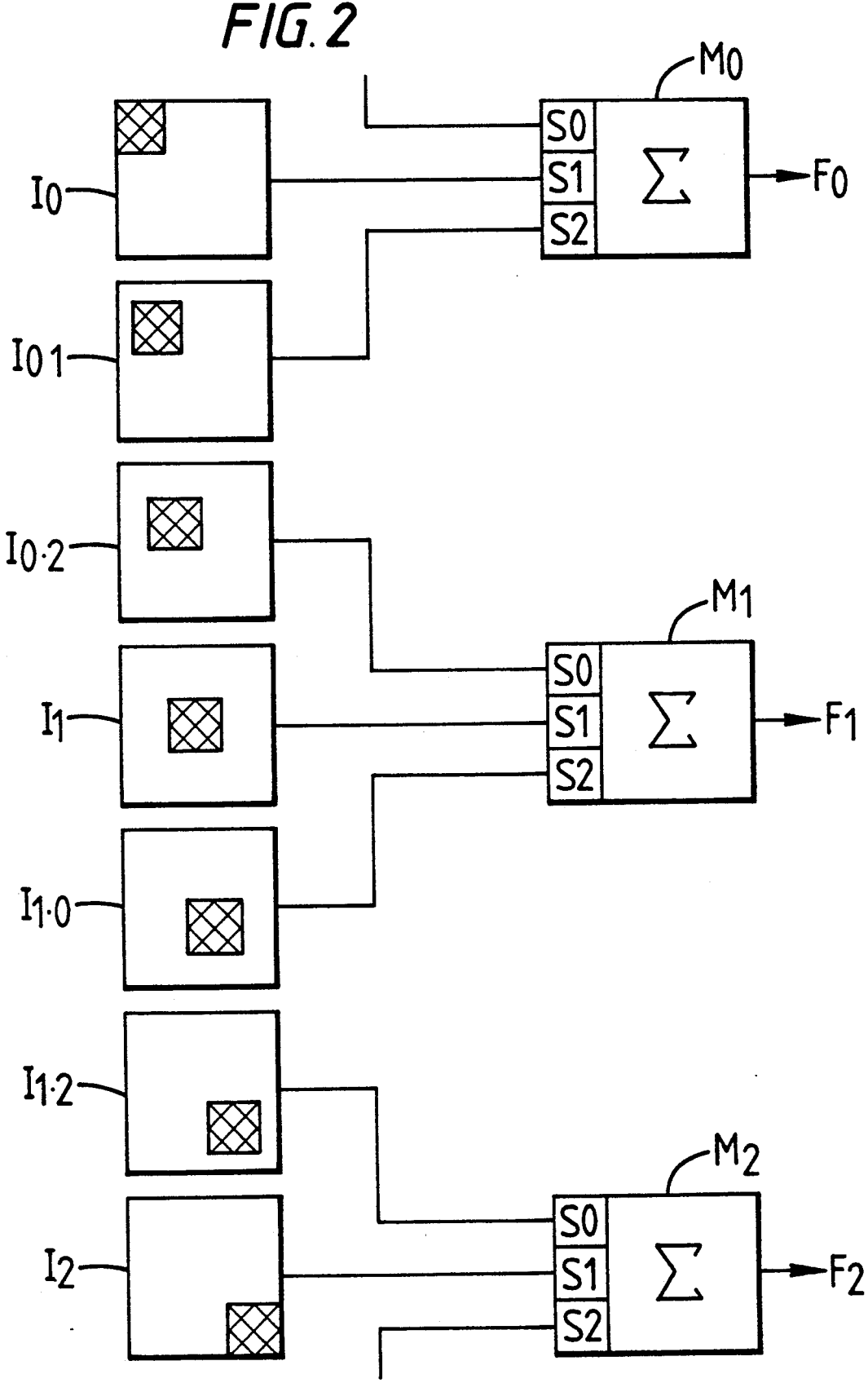
FIG. 2 is a schematic diagram illustrating the principle of operation of the invention.
Figure 3:
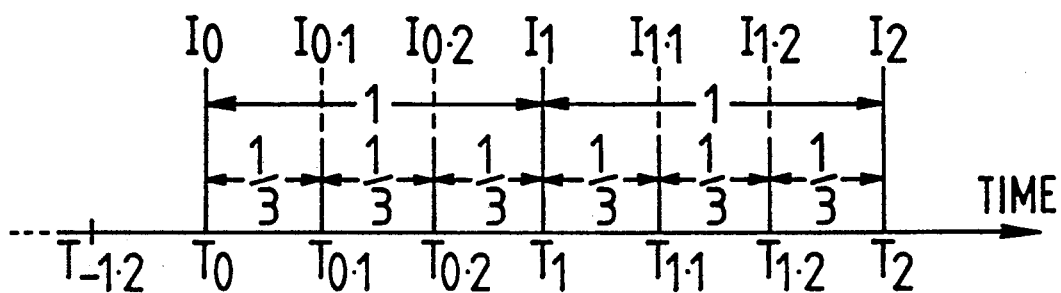
FIG. 3 is a diagram used in the explanation of FIG. 2.

FIG. 2 represents, conceptually, an example of the generation of a sequence of images in accordance with the invention. Images $I_0$, $I_1$ and $I_2$ in FIG. 2 correspond to the three images illustrated in FIG. 1 which would normally be output as the foreground by a conventional digital video effects apparatus for the timings $T_0$, $T_1$, and $T_2$, respectively. If it were possible to produce images at a higher rate than that represented by the three images $I_0$, $I_1$, $I_2$, etc. at the timings $T_0$, $T_1$, $T_2$, then it would be possible to reduce the temporal aliasing of the motion represented thereby. In the case of the images shown in FIG. 1, for example, if it were possible to output images at three times the standard rate, the movement of the $3 \times 3$ block of pixels would be 1 pixel per output image. A combination of the images $I_0$, $I_1$, and $I_2$ with intermediate images $I_{0.1}$, $I_{0.2}$, $I_{1.1}$ and $I_{1.2}$ illustrates this, the images $I_0$, $I_{0.1}$, $I_{0.2}$, $I_1$, $I_{1.1}$, $I_{1.2}$ and $I_2$ corresponding to timings $T_0$, $T_{0.1}$, $T_{0.2}$, $T_1$, $T_{1.1}$, $T_{1.2}$ and $T_2$ respectively as illustrated in FIG. 3. However it is assumed that the digital video effects apparatus is constrained to outputting the images at a given rate although the speed of movement of the effects within those images can vary. In other words, it is assumed that the digital video effects apparatus is constrained to producing output images such as the images $F_0$, $F_1$, and $F_2$ at successive field timings corresponding to $T_0$, $T_1$, and $T_2$, respectively. It is also assumed, for the moment, that the background of the images shown in FIG. 2 is black.

As illustrated in FIG. 2, selected constituent images $I_0$, $I_{0.1}$, etc. are combined as represented by the blocks $M_0$, $M_1$, and $M_2$, respectively to given output images $F_0$, $F_1$, $F_2$.

Normally, each of the scaling factors S0, S1 and S2 will be equal, although they could be set to different values to achieve special effects. However, the sum of the scaling factors should equal unity (i.e. $Si = 1$). In FIG. 2, it is assumed that $S0 = S1 = S2 = \frac{1}{3}$.

The effect of combining the images in this way is to create output images $F_0$, $F_1$, $F_2$ and so on which appear blurred because they comprise image constituents for different timings. Thus, for FIG. 2, the output image $F_1$ comprises images related to timings $T_{0.2}$, $T_1$ and $T_{1.1}$, namely images $I_{0.2}$, $I_1$ and $I_{1.1}$, each at $\frac{1}{3}$ original intensity. The resulting image is represented schematically in FIG. 4.

It should be noted that FIG. 2 is provided for explaining the basic concept behind the present invention for emulating motion blurring in a digital video effects system. Practical embodiments of the invention are described below.

Figure 5:
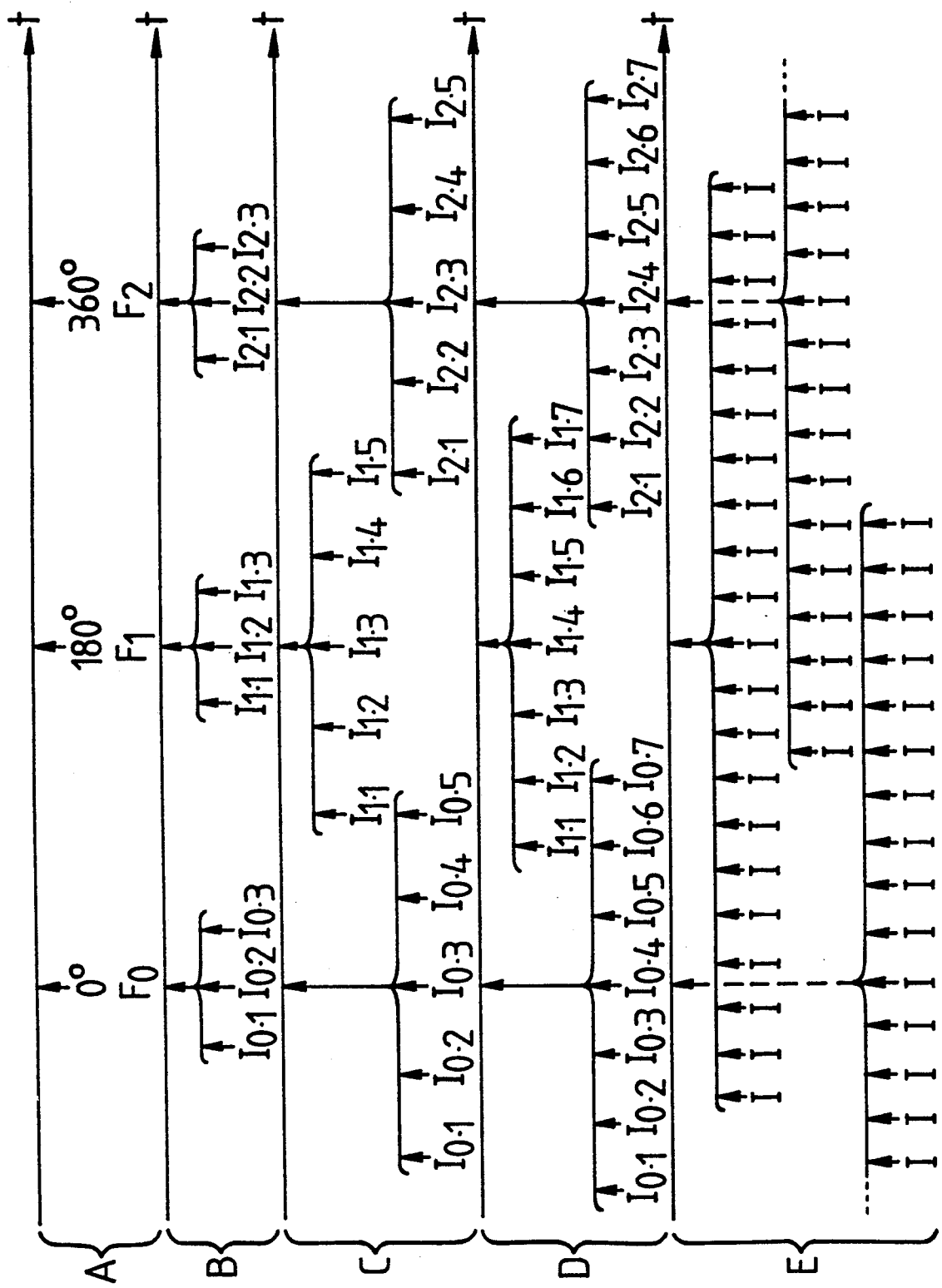
FIG. 5 is a timing diagram for explaining the operation of the invention.

FIG. 5 illustrates the timings at which images could be generated in a digital video effects system in accordance with the invention for emulating different shutter characteristics. FIG. 5 is drawn as a series of timing diagrams with respect to real time as represented by the horizontal axes labelled t. Timing diagram A represents the timing of successive fields of an output sequence of images. Thus field $F_0$ is produced at a timing illustrated by the arrow at 0 degrees. Field $F_1$ is produced at a timing corresponding to the arrow indicated at 180 degrees. Field $F_2$ is produced at a timing indicated by the arrow at 360 degrees.

Timing diagram B illustrates the emulation of a 30° film camera shutter, as commonly used for sports photography, operating at 30 Hz (i.e. 1/6 field integration time). In this particular example, sets of three constituent images I are used to emulate the 1/6 field integration time and are combined for each of the output images F. It should be noted, that a different number of constituent images I could be used to perform each of the output images F. However, those constituent images should be spread over the appropriate integration time.

Timing diagram C illustrates the timing of constituent images in order to emulate a 180° shutter operating at 30 Hz. In this case, sets of five constituent images I are combined to generate each output image F. In this example, the timing of the last constituent image I for each output image F is coincident with that for the first constituent image I of the next output image F. In this case, a different number of constituent images could be selected, with the constituent images I being distributed within the appropriate integration time.

Timing diagram D illustrates the timing of constituent images I for emulating a 166° shutter operating at 24 Hz. In this case, it can be noted that the integration periods for successive output images overlap. Here sets of seven constituent images I are combined for each output image F. Once again, a different number of constituent images I could be selected with the constituent images being spread over the appropriate integration periods.

Timing diagram E represents the generation of constituent images for emulating a very laggy camera or a special effect, where the integration period for an output image F overlaps the timing of adjacent output images F. As with the previous examples, the number of constituent images can be selected in order to give the desired degree of smoothness to the blurring effect.

It will be appreciated that the above are merely examples of the timing of constituent images for emulating particular shutters. Other combinations of constituent images and timings can be chosen to achieve a desired effect.

There now follows a description of a number of examples of digital video effects systems in accordance with the invention, which enable a source image sequence to be processed to provide digital video effects such as translation, rotation and so on of the source image sequence including the incorporation of motion blurring in those effects. In the following examples, three constituent images I are combined to generate each output image F of the output image sequence.

Figure 6:
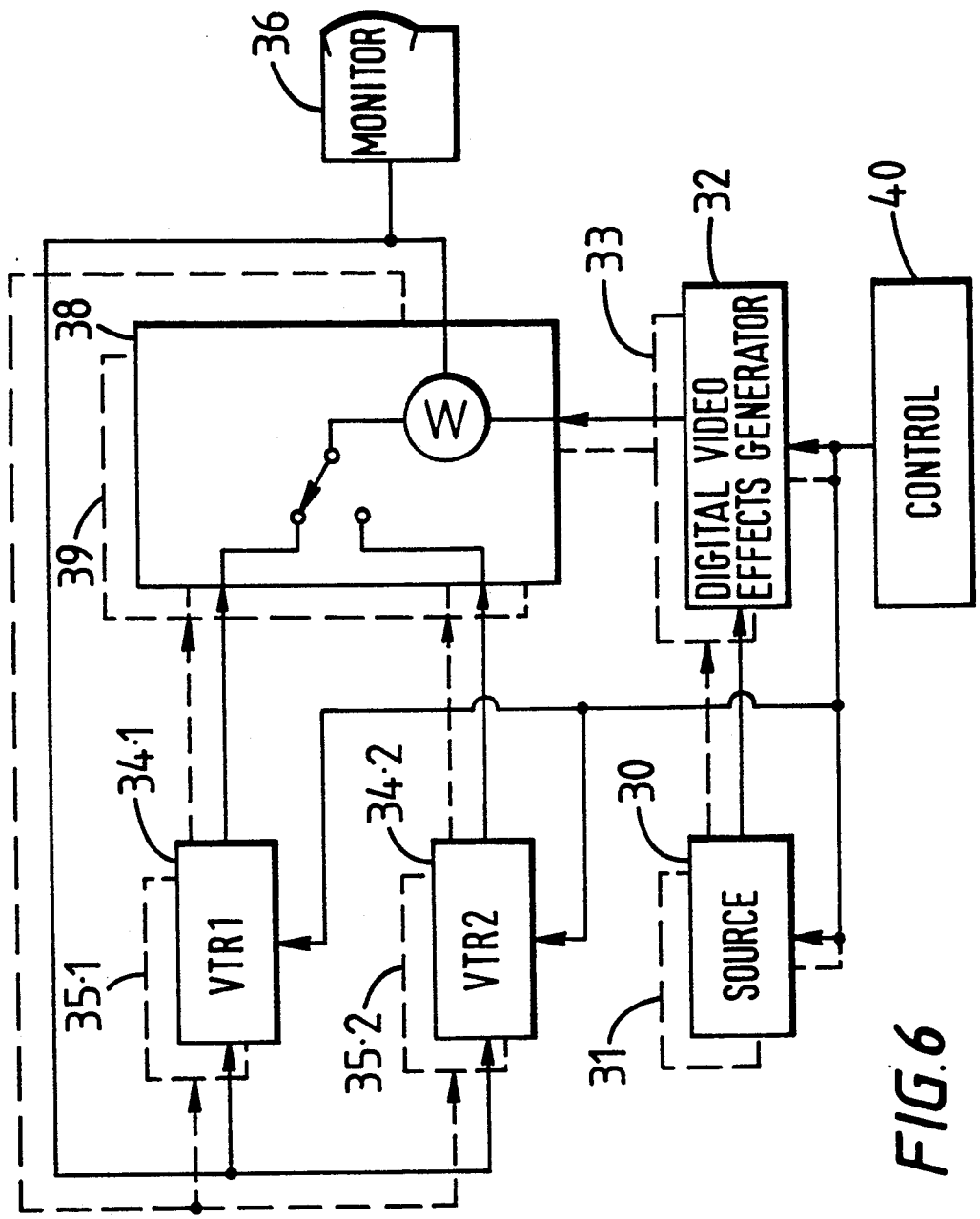
FIG. 6 is an overview of a digital video effects system for implementing the invention.

FIG. 6 illustrates one embodiment of apparatus in accordance with the present invention. The apparatus in FIG. 6 comprises a source tape playback device 30 for containing a source image sequence. In the example, this source image sequence is processed by a digital video effects generator 32 in a number of passes in order to build up an output image sequence. Foreground images for each pass are output by the digital video effects generator 32 to a switcher 38 which combines the results of any one pass with the results of previous passes. The apparatus in FIG. 6 comprises first and second VTRs 34.1 and 34.2 which operate in an alternating manner for receiving the results of a pass and for outputting the results of a previous pass. The apparatus in FIG. 6 also comprises a parallel arrangement of a source key playback device 31, a key processing unit 33, switcher 39, with VTRs 35.1 and 35.2 for key signals for reasons which will be explained later.

Figure 7:
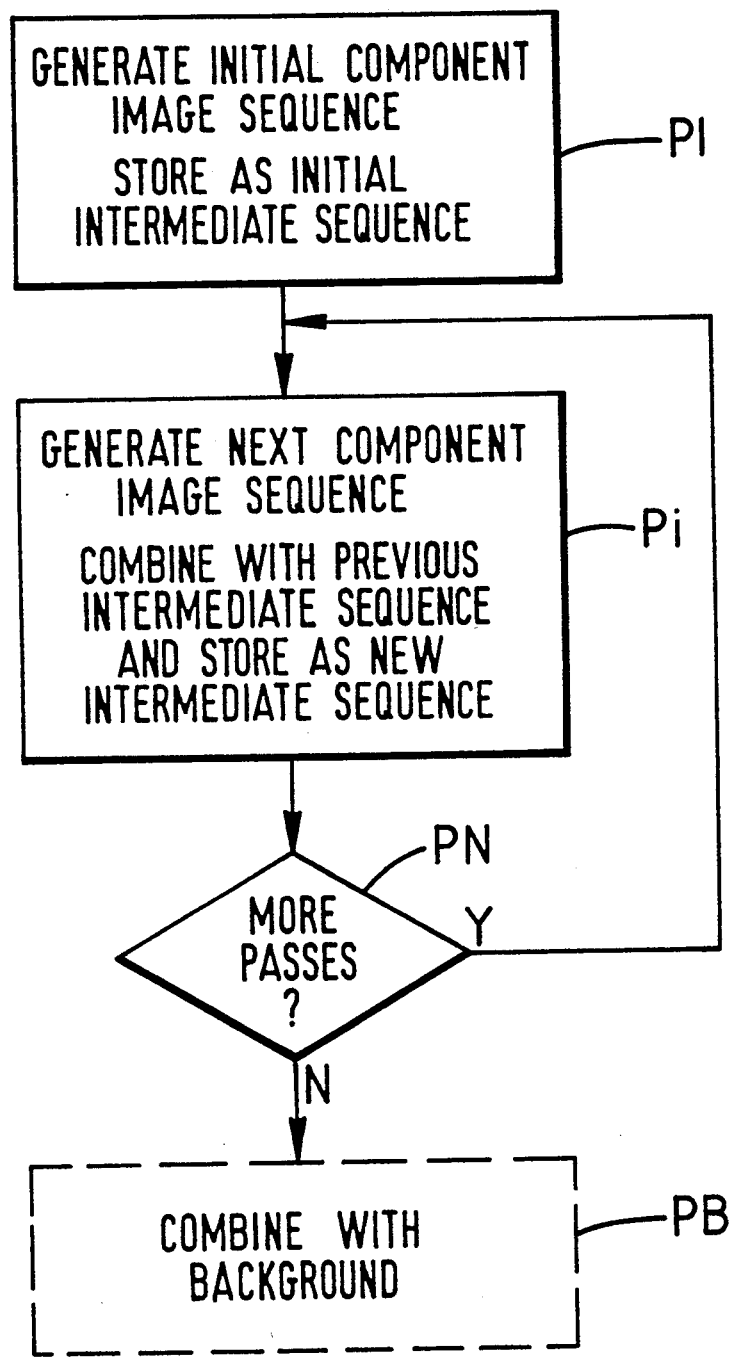
FIG. 7 is a flow diagram of the operation of the system of FIG. 6.

The operation of the apparatus in FIG. 6 will now be described with reference to FIG. 7. During a first pass (P1), the source tape playback device 30 provides source images from a source image sequence one at a time to the digital video effects generator 32. The generator 32 is controlled by a control unit 40 to produce a first series of manipulations representative of a first sequence of timings to the respective images from the source playback device 30. The first sequence of manipulated images corresponds to the image $I_{0.1}$, $I_{1.1}$ $I_{2.1}$ etc of timing diagram B in FIG. 5. The sequence of manipulated images is scaled by a scaling factor (here ⅓ as three passes are performed) then stored on the first video tape recorder (VTR) 34.1.

In a second pass (Pi) the images from the source tape playback device 30 are manipulated in the digital video effects generator 32 in accordance with a second sequence of manipulations representative of a different timing with respect to those of the first pass and are scaled by the scaling factor. The second sequence of manipulated images corresponds to the images $I_{0.2}$, $I_{1.2}$, $I_{2.2}$ etc of timing diagram B of FIG. 5. At the same time, the result of the first pass is played back from the VTR 34.1 and combined in the switcher 38 with the output of the digital video effects generator 32. The result of this combination is stored on the second VTR 34.2.

In a third pass (Pi) the images from the source tape playback device are manipulated in the digital video effects generator 32 in accordance with a third sequence of manipulations representative of a different timing with respect to those of the first pass and are scaled by the scaling factor. The third sequence of manipulated images corresponds to the images $I_{0.3}$, $I_{1.3}$, $I_{2.3}$ etc. of timing diagram B of FIG. 4. At the same time, the results of the combination of the first and second passes is played back from the VTR 34.2 and combined in the switcher 38 with the output of the digital video effects generator 32. The results of this combination is then stored on the first VTR 34.1. Thus, it can be seen that the first and second VTRs 34.1 and 34.2 are used in a ping pong manner for compiling the output image sequence.

The results of each pass can be viewed on the monitor 36 in real time as the combined image sequence is output from the switcher 38. In other words, the processing of each pass is at the normal playback speed of the source tape playback device 30 with the result that it could be viewed by an operator to assess the degree of motion blurring which has been achieved. However, in practice the operator is more likely to process fully in advance short sequences with different numbers of constituent images to assess the effect to be obtained before preceding to process the complete sequence.

In the present case, after the three passes, the desired output sequence is stored on the first VTR 34.1. However, in general, this process continues until (PN) a number of intermediate images have been combined which generates an output foreground sequence with the desired degree of motion blurring.

The sequence of images stored on the VTR 34.1 can be used directly as the output image if the background concerned is black. However, in the general case it will be desired to combine the sequence of output images produced by the above process with a background (step PB in FIG. 7). In order to key the image generated by combining the constituent images into the background, it is necessary to generate a key signal. Accordingly, as mentioned above, the system illustrated in FIG. 6 is provided with a parallel key processing system. The original key signal effectively comprises a mask with a first value (e.g. 1) indicating an active part of the source images, and a second value (e.g. 0), indicating the non-active parts of the source image where background is to be displayed. This source key signal could be supplied from a key VTR 31, additional to the source VTR 30 and operating in synchronism therewith, or could alternatively be provided from the source VTR 30, the key signal having been stored separately from the source video data on a video recording medium.

In FIG. 6, for ease of explanation, it is assumed that there is a second source VTR 31 containing the key information. A second digital video effects generator 33 is also illustrated in FIG. 6 for processing the key signal which it receives from the source key VTR 31. The second digital video effects generator is connected to receive the same control information from the control unit 40 for processing the key signal in parallel with the processing of the image signals by the digital video effects generator 32. Note, that in other embodiments of the invention that the key signal could, however, be processed by the digital video effects generator 32 if it is adapted to do so by the provision of an extra key channel in addition to the normal three R, G, B (or Y, U, V) channels.

The output from the digital video effects generator 33 is provided to a key switcher 39 in parallel with the switcher 38. The key switcher 39 is also connected to key VTRs 35.1 and 35.2. These key VTRs 35.1 and 35.2 are used for compiling a key signal in parallel with the processing of the image signals. Note, that for each pass, the key signal values will be scaled down by the digital video effects generator 33 by the same amount as the image signals are scaled down by the digital video effects generator 32. In the present example, therefore, where three constituent images are combined to form each output image, rather than outputting a signal 1 for the active parts of the source images on each pass, a ⅓ signal will be output for the active areas of the source image on each pass. Thus, the key signal for a particular pixel of the output image will have one of four values in the present case. It will have the value 0 where the active parts of none of the constituent images contribute to that pixel, the value ⅓ where a pixel of one of the constituent images contributes to that pixel of the output image, the value ⅔ where two pixels from constituent images contribute to that pixel at the output image, and one where three pixels from respective constituent images contribute to that pixel of the output image.

Figure 8:
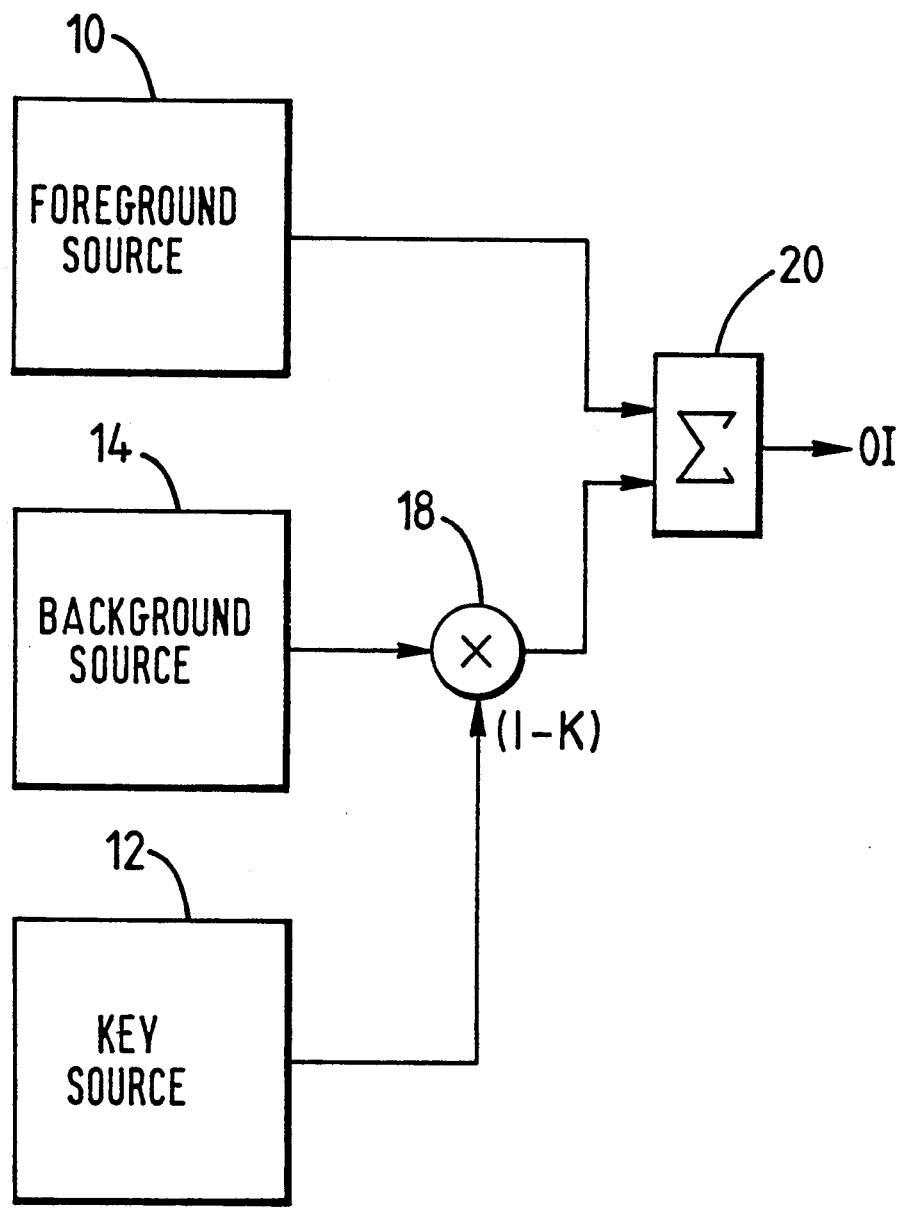
FIG. 8 is a schematic diagram illustrating a further part of an example of a digital video effects system in accordance with the invention.

FIG. 8 is a schematic diagram for apparatus for combining the output image sequence of images F (in the example described above as stored on the VTR 34.1) with a background from a background source in accordance with the key signal generated as described above (as stored on the VTR 35.1 in the example described above). In FIG. 8, the output image sequence, which, in the above example would be stored on the VTR 34.1, is shown as being provided from a foreground source 10. The key signal, which, in the above example would be stored on the VTR 35.1, is shown in FIG. 8 as being provided from a key source 12. The background is shown as being provided from a background source 14. The operation of the three signal sources 10, 12 and 14 is controlled by a control system (not shown) to output the signals in synchronism. A multiplier 18 passes a percentage of the background in accordance with a signal $(1-K)$ derived from the key signal (K). The output image sequence signals from the foreground source 10 are added to the background signal from the multiplier 18 in an adder 20 to generate a final output image sequence OI. The combination of the background and the foreground for each pixel of the final output image sequence OI has a total intensity value of unity. Thus, if $K=0$, full background intensity is selected by the multiplier 18. If the key signal $K=\frac{1}{3}$, two thirds background intensity is selected by the multiplier 18. If the key signal K is two thirds, $\frac{1}{3}$ background intensity is selected by the multiplier 18. If the key signal K is one, zero background intensity is selected by the multiplier 18. The foreground intensities need not be further modified before combination as they already have the appropriate intensities.

Figure 9:
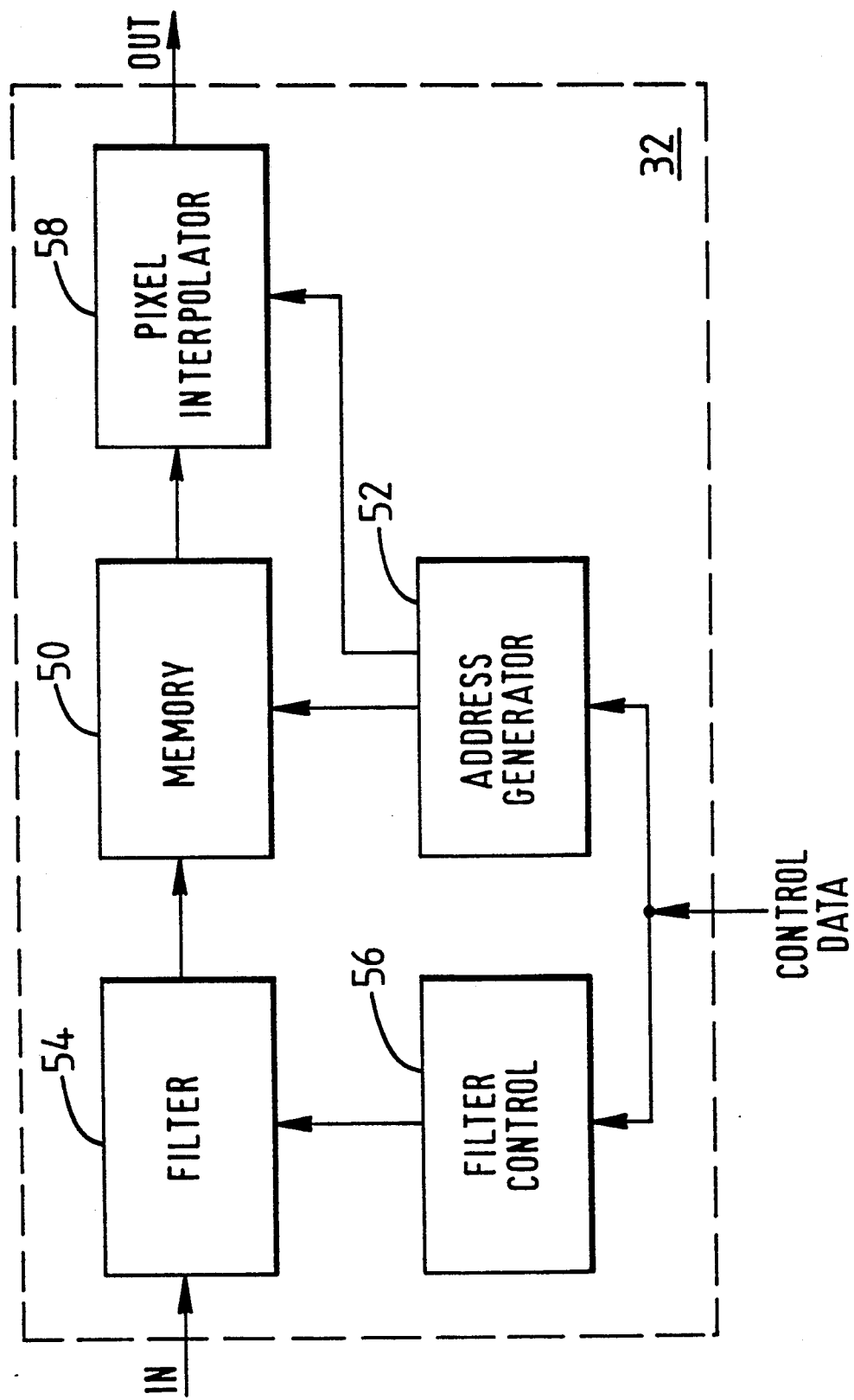
FIG. 9 is a schematic block diagram of a digital video effects generator.

FIG. 9 is a schematic block diagram of a typical digital video effects generator which can be used in the apparatus illustrated in FIG. 6. As the digital video effects generator can be conventional, it will not be described in detail herein. In summary, the digital video effects generator operates as follows. A video signal representing each source image to be manipulated is input into the digital video effects generator 32. Manipulation of the source image(s) is performed in the digital video effects generator 32 by controlling either the read or the write addresses to a memory 50 where temporary storage of the image data is effected. As illustrated in FIG. 9, read side addressing is employed, this being controlled by the address generator 52. A pixel interpolator 58 enables output pixel values to be computed where the address generator 52 does not generate a one-to-one mapping between a storage location in the memory 50 and an output pixel. The addresses produced by the address generator 52 include an integer portion for addressing the memory 50 and a fractional portion for controlling the pixel interpolator 58. As, in the processing of images, the manipulation may involve compression of the image and in the absence of corrective measures, compression of an image can give rise to aliasing which will degrade the quality of the output image, a filter 54 is provided to compensate for the effects of compression. Filter control 56 determines local scaling factors for controlling the filter 54. The address generator 52 determines addresses for mapping the pixel data out of the memory 50 in accordance with a particular manipulation to be performed in response to control data from the control unit 40. The control unit 40 can be in the form of a personal computer or computer workstation with appropriate software, or can be provided as an integral part of the digital video effects generator 32.

The control data supplied by the control unit 40 defines the surface of an object onto which each source image is to be mapped. Thus, in order to generate a moving digital video effects, the control unit 40 generates, for successive images produced by the digital video effects generator, control data representative of a changing object surface and/or a changing orientation or placement of the object surface within an image area.

Whereas, in the prior art, one sequence of control data would be generated for successive image timings of the output image sequence, the control unit 40 for the digital video effects system of FIG. 6 will produce a plurality of sequences of control data for successive timings including timings intermediate the timings of the images of the output image sequence.

In the apparatus of FIG. 6, for the first pass, the control unit 40 generates control data for a first sequence of constituent images $I_{0.1}$, $I_{1.1}$ etc. for a first sequence of timings. An appropriate scaling factor (in the specific example described $\frac{1}{3}$) is applied to the intensities of the images before being output to the switcher 38 for storage on the VTR 34.1.

For the second pass, the control unit 40 generates control data for the second sequence of constituent images $I_{0.2}$, $I_{1.2}$ etc. displaced in time with respect to the first sequence of constituent images. The $\frac{1}{3}$ scaling factor is applied to the intensities of this second sequence of constituent images and they are then output to the switcher where they are combined with respective images from the VTR 34.1 (i.e. image $I_{0.2}$ is combined with $I_{0.1}$) $I_{1.2}$ with $I_{1.1}$ etc.) from the VTR 34.1 and are stored on the VTR 34.2.

For the third pass the control unit 40 generates control data for the third sequence of constituent images $I_{0.3}$, $I_{1.3}$ etc. for timings displaced with those for the first and second sequences of constituent images. The one $\frac{1}{3}$ scaling factor is applied to the intensities of this third sequence of constituent images and they are then output to the switcher 38 where they are combined with the respective images from the VTR 34.1 (i.e. image $I_{0.3}$ is combined with $I_{0.1}$ $I_{0.2}$; $I_{1.3}$ is combined with $I_{1.1}$, $I_{1.2}$ etc) and are stored on the VTR 34.2.

Control signals from the control unit 40 will also be supplied to the parallel key digital video effects generator 33 for processing the key signal in the same manner.

Figure 4:
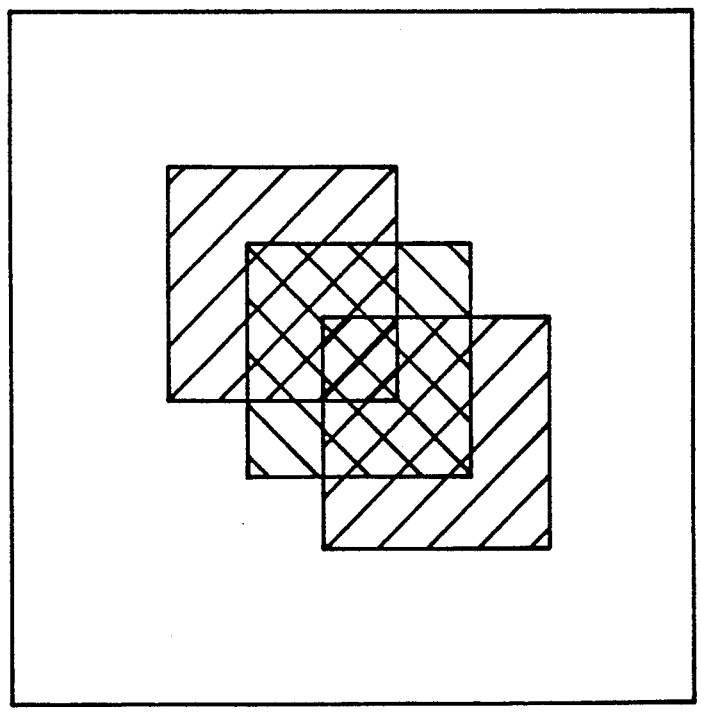
FIG. 4 is an example of an image manifesting image blurring.

At the end of the third pass, therefore, a foreground image sequence corresponding to images $F_0$, $F_1$, $F_2$ etc. of FIG. 4 is held on the VTR 34.1 and a corresponding key sequence is stored on the VTR 35.1. The foreground signals can then be combined with an appropriate background using the key signal as explained above with respect to FIG. 8.

FIG. 10 is an alternative implementation of apparatus in accordance with the invention in which the constituent images are generated and combined within a single digital video effects generator 62, a parallel key digital video effects generator 63 being provided for processing a key signal. In the example shown in FIG. 10, a source VTR 60 provides one source video image at a time from a source video sequence to the digital video effects generator 62. This digital video effects generator 62 produces a plurality of constituent images for each source image, which it combines and then outputs to a first output VTR 66. The key digital video effects generator 63 likewise processes a key to produce an output key which is supplied to a second output VTR 68. The VTRs 60, 61, 66 and 68 and the digital video effects generators 62 and 63 operate under the control of a control processor 64, which causes the source images and keys of the source video sequence to be read from the source VTR 60 and key VTR 61 at one nth of normal playback speed, where n is the number of intermediate images which are combined in order to form each output video image. The control logic causes the output images, which are also generated at one nth of real time speed, to be stored on the output VTRs 66 and 68. The apparatus illustrated in FIG. 10 has the advantage of requiring less VTRs. However, it is not possible to observe the motion blurring in real time during processing, it being necessary to replay the output VTRs 66 and 68 after processing of the complete image sequence. The output image and key sequences stored on the VTR's 66 and 68, respectively can be combined with appropriate background information to be displayed in an output image sequence using apparatus such as illustrated in FIG. 8.

FIG. 11 illustrates a third implementation of apparatus in accordance with the present invention. In this embodiment, source image data from a source VTR 70 is supplied to a plurality of digital video effects generators 72,0, 72.1, 72.2 under common control from a control unit 74. Each of the digital video effects generators 72.0, 72,1, and 72.2 performs a different modification of the source image. In other words, for example, digital video effects generator 72.0 could generate the first constituent image for generating each output image in the output sequence, the digital video effects generator 72.1 being arranged to produce second constituent image for each output image and the digital video effects generator 72.2 being arranged to produce the third constituent image for each output image. The set of three constituent images output for each output image from the digital video effects generators 72.0, 72.1 and 72.2 are then combined in summation logic 76 in accordance with weighting factors allocated by weights, S1, S2 and S3 in weighting logic 78. In the present case it is assumed that $S0 = S1 = S2 = \frac{1}{3}$. In parallel with the source VTR 70 the digital video effects generators 72.0, 72.1 and 72.2 and the weighting logic 78 and the summation logic 76 for processing the image sequence, there is a parallel arrangement of a source key VTR 71, key digital video effects generators 73.0, 73.1, 73.2 weighting logic 79 and summation logic 77 and output key video tape recorder 81 for processing a key signal. In this embodiment, the number of digital video effects generators for processing images corresponds to the number of images which are combined in order to give the desired degree of motion blurring. In addition there is an equal number of digital video effects generators for processing the key signal. The equipment shown in FIG. 11 enables the motion blurring to be generated in real time under the control of the control unit 74. However, it does require a large investment in hardware.

There has been described, a number of embodiments of digital video effects systems which are able to emulate motion blurring. It will be apparent, however, that many other additions and/or modifications are possible within the scope of the present invention.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An apparatus for providing digital video effects comprising:
   means for inputting a sequence of input video images; control means for generating a control signal;
   digital video effects generating means for receiving and manipulating said sequence of input video images in response to said control signal so as to generate a sequence of constituent images at respective constituent image timings in which different image manipulations are performed on successive ones of said constituent images, and in which said digital video effects generating means in response to said control signal, applies on intensity weighting factor to each of the constituent images such that a set of intensity weighting factors having a summed value of substantially unity is applied to each of said sets of said constituent images; and
   combining means for combining sets of said constituent images generated by said digital video effects generator means into respective output images for producing video effects which change with time.

2. The apparatus according to claim 1, wherein each of the sets of said constituent images has a number of said constituent images and wherein each of the intensity weighting factors in the set of intensity weighting factors is a reciprocal of the number of constituent images in the corresponding set of constituent images.

3. An apparatus for providing digital video effects comprising: means for inputting a sequence of input video images; control means for generating a control signal; digital video effects generating means for receiving and manipulating said sequence of input video images in response to said control signal so as to generate a sequence of constituent images at respective constituent image timings in which different image manipulations are performed on successive ones of said constituent images, said digital video effects generating means further receiving and manipulating input key signals in response to said control signal in a manner corresponding to the manipulation of the input video images to generate a sequence of constituent key signals at respective constituent image timings; image combining means for combining sets of said constituent images generated by said digital video effects generator means into respective output images for producing video effects which change with time; and key combining means for combining sets of said constituent key signals generated by said digital video effects generating means into respective output key signals.

4. The apparatus according to claim 3, wherein said digital video effects generating means, in response to said control signal, applies an intensity weighting factor to each of the constituent key signals such that a set of intensity weighting factors having a summed value of substantially unity is applied to each of said sets of said constituent key signals.

5. The apparatus according to claim 4, wherein each of the sets of said constituent key signals has a number of said constituent key signals and wherein each of the intensity weighting factors in each said set of intensity weighting factors is a reciprocal of the number of constituent key signals in the corresponding set of constituent key signals.

6. The apparatus according to claim 3 further comprising keying means having multiplier means and adding means for combining each of the respective output images with background information, in which the multiplier means applies a multiplication factor for each of the output images which is determined by subtracting the corresponding output key signal from unity so as to produce an output signal therefrom which is added to the respective output images by said adding means.

7. An apparatus for providing digital video effects comprising: means for inputting a sequence of input video images; control means for generating a control signal; digital video effects generating means for receiving and manipulating said sequence of input video images in response to said control signal so as to generate a sequence of constituent images at respective constituent image timings in which different images manipulations are performed on successive ones of said constituent images; and combining means for combining sets of said constituent images generated by said digital video effects generator means into respective output images for producing video effects which change with time, said combining means including first and second storage means for storing intermediate images, and switch means for selecting an output from one of the first and second video storage means, and wherein said combining means combines an output of the switch means and respective ones of the constituent images from said digital video effects generating means and supplies an output therefrom to an input of each of the first and second video storage means, and further wherein the apparatus operates in a plurality of passes, such that, in a first pass, a first sequence of constituent images commensurate with a first sequence of image timings is generated by the digital video effects generating means and is supplied therefrom to one of said first and second video storage means so as to be stored therein as a sequence of said intermediate images; and, in subsequent passes, a respective further sequence of constituent images commensurate with a further sequence of image timings is generated by the digital video effects generating means and is combined by said combining means with the output of the one of the first and second video storage means elected by said switch means which contains the most recently stored sequence of said intermediate images and the output therefrom in the other of the first and second video storage means as a new sequence of said intermediate images.

8. The apparatus according to claim 7, wherein said apparatus further comprises key processing means and key combining means including third and fourth video storage means for storing sequences of intermediate key signals, and key switch means for selecting an output from one of the third and fourth video storage means, and wherein said key combining means combines an output of the key switch means and an output of the key processing means and supplies an output therefrom to an input of each of the third and fourth video storage means, and wherein the apparatus operates such that, in the first pass, a first sequence of constituent key signals for the first sequence of constituent images is generated by the key processing means from a sequence of input key signals and is supplied therefrom to one of the third and fourth video storage means so as to be stored therein as an initial sequence of said intermediate key signals; and in the subsequent passes, a respective further sequence of constituent key signals for a corresponding further sequence of constituent images is generated by the key processing means from a respective further sequence of said input key signals and is combined by said key combining means with the output of the one of the third and fourth video storage means selected by said key switch means which contains the most recently stored sequence of said intermediate key signals and the output therefrom is stored on the other of the third and fourth video storage means as a new sequence of said intermediate key signals.

9. The apparatus according to claim 8, wherein the apparatus further comprises means for inputting the sequences of the input key signals.

10. An apparatus for providing digital video effects comprising: means for inputting a sequence of input video images; control means for generating a control signal; digital video effects generating means for receiving and manipulating said sequence of input video images in response to said control signal so as to generate a sequence of constituent images at respective constituent image timings in which different image manipulations are performed on successive ones of said constituent images, and in which each of the sets of said constituent images has a number of said constituent images;

an additional number of digital video effects generating means, the total number of said digital video effects generating means corresponding to the number of constituent images in each of the sets of constituent images, each of said digital video effects generating means generating a respective sequence of constituent images such that a corresponding one of the constituent images from each of said sequence of constituent images forms one of the sets of constituent images; and combining means for combining each of the sets having the corresponding ones of the constituent images from the respective digital video effects generating means so as to form respective output images for producing video effects which change with time.

11. The apparatus according to claim 10, wherein the apparatus further comprises means for storing the output images.

12. The apparatus according to claim 10, wherein the apparatus further comprises a plurality of key processing means, equal in number to the number of said digital video effects generating means, in which each of the key processing means generates a respective sequence of constituent key signals in response to said control signal and key combining means for combining the respective sequences of constituent key signals so as to form respective output key signals.

13. The apparatus according to claim 12, wherein the apparatus further comprises means for storing the output key signals.

14. A method of emulating motion blurring in an apparatus for providing digital video effects and having means for inputting a sequence of input video images, control means for generating a control signal, and digital video effects generating means for receiving and manipulating said sequence of input video images in response to said control signal, said method comprising the steps of:

generating a sequence of constituent images at respective constituent image timings in which different image manipulations are performed on successive ones of said constituent images; and combining sets of said constituent images into respective output images for producing video effects which change with time, the constituent images of each of said sets of constituent images being combined in accordance with a set of intensity weighting factors in which each said set of intensity weighting factors has a summed value of substantially unity.

15. The method according to claim 14, wherein each of the sets of said constituent images has a number of said constituent images and wherein each of the intensity weighting factors in the set of intensity weighting factors is a reciprocal of the number of constituent images in the corresponding set of constituent images.

16. A method of emulating motion blurring in an apparatus for providing digital video effects and having means for inputting a sequence of input video images, control means for generating a control signal, and digital video effects generating means for receiving and manipulating said sequence of input video images in response to said control signal, said method comprising the steps of:

generating a sequence of constituent images at respective constituent image timings in which different image manipulations are performed on successive ones of said constituent images; combining sets of said constituent images into respective output images for producing video effects which change with time;

receiving and manipulating input key signals in a manner commensurate with the manipulation of the input video images so as to generate a sequence of constituent key signals at respective constituent image timings; and combining sets of said constituent key signals into respective output key signals.

17. The method according to claim 16, wherein the constituent key signals of each of said sets of constituent key signals are combined in accordance with a set of intensity weighting factors in which said set of intensity weighting factors has a summed value of substantially unity.

18. The method according to claim 17, wherein each of the sets of said constituent key signals has a number of said constituent key signals and wherein each of the intensity weighting factors in each said set of intensity weighting factors is a reciprocal of the number of constituent key signals in the corresponding set of constituent key signals.

* * * * *